United States Patent
Rijckaert et al.

[11] Patent Number: 6,078,448
[45] Date of Patent: Jun. 20, 2000

[54] RECORDING OF SUBCODE SIGNALS IN SLANT TRACKS ON A RECORD CARRIER

[75] Inventors: Albert M. A. Rijckaert; Adrianus J. M. Denissen, both of Eindhoven, Netherlands

[73] Assignee: U.S. Philips Corporation, New York, N.Y.

[21] Appl. No.: 08/995,470

[22] Filed: Dec. 22, 1997

[30] Foreign Application Priority Data

Jan. 21, 1997 [EP] European Pat. Off. ............... 97200180

[51] Int. Cl.⁷ .................................................. G11B 5/09
[52] U.S. Cl. ............................................................ 360/48
[58] Field of Search ........................................ 360/32, 48

[56] References Cited

U.S. PATENT DOCUMENTS

| | | | |
|---|---|---|---|
| 5,142,421 | 8/1992 | Kahlman et al. | 360/40 |
| 5,303,091 | 4/1994 | Sakurai | 360/32 |
| 5,579,183 | 11/1996 | Van Gestel et al. | 360/48 |
| 5,844,739 | 12/1998 | Mizushima et al. | 360/48 |

FOREIGN PATENT DOCUMENTS

| | | |
|---|---|---|
| WO9522143 | 8/1995 | WIPO . |
| WO9528061 | 10/1995 | WIPO . |

Primary Examiner—W. Chris Kim
Attorney, Agent, or Firm—Edward W. Goodman

[57] ABSTRACT

An apparatus for recording a digital information signal and a subcode signal in slant tracks (FIG. 1) on a record carrier (140), includes an input (111) for receiving the digital information signal and an input (123) for receiving the subcode signal. Portions of information of the subcode signal are accommodated into subcode signal blocks (FIG. 2) and portions of information of the information signal are accommodated into information signal blocks (main sync blocks, FIG. 1). The subcode signal blocks and the information signal blocks are combined into a composite signal for recording the tracks on the record carrier. Time code signals are generated and accommodated in specific subcode signal blocks in the subcode signal recording portion having sequence numbers that satisfy the following formula:

$$N(i)=\{N(i-1)+1+2\cdot p\}\bmod 2^m,$$

where p is an integer positive constant for which holds $0 \leq p \leq 2^{(m-1)}-1$, and N(i) is the sequence number of the subcode sync block in a track numbered i in which a time code signal can be recorded, and that N(i) is an integer that can have a value from 0 to 2m−1. The apparatus further includes a writing unit (136) for writing the composite signal in said tracks on the record carrier.

11 Claims, 7 Drawing Sheets

| | MSB $b_7$ | | | $b_4$ | $b_3$ | | | $b_0$ LSB |
|---|---|---|---|---|---|---|---|---|
| $pw_0$ | 0 | 0 | 0 | 1 | 1 | 0 | 0 | 1 |
| $pw_1$ | BF | TENS of FRAMES | | | UNITS of FRAMES | | | |
| $pw_2$ | CF | TENS of SECONDS | | | UNITS of SECONDS | | | |
| $pw_3$ | DF | TENS of MINUTES | | | UNITS of MINUTES | | | |
| $pw_4$ | SF | SGN | TENS of HOURS | | UNITS of HOURS | | | |
| $pw_5$ | | TENS of DAYS | | | UNITS of DAYS | | | |

RECORDING OF SUBCODE SIGNALS IN SLANT TRACKS ON A RECORD CARRIER

BACKGROUND OF THE INVENTION

1. Field of the Invention

The invention relates to an apparatus for recording a digital information signal and a subcode signal in slant tracks on a record carrier, the apparatus comprising:

input means for receiving the digital information signal and the subcode signal, formatting means for accommodating portions of information of the subcode signal into subcode signal blocks, and for accommodating portions of information of the information signal into information signal blocks, and for combining the subcode signal blocks and the information signal blocks into a composite signal for recording the tracks on the record carrier, means for generating a time code signal, and for accommodating time code signals in specific subcode signal blocks, and writing means for writing the composite signal in said tracks on the record carrier, such that a number of $2^m$ subcode signal blocks are recorded in a subcode signal recording portion of a track and a plurality of information signal blocks are recorded in an information signal recording portion of a track, where m is an integer larger than 0.

The invention further relates to a method of recording the digital information signal and the subcode signal in slant tracks on the record carrier, and to a record carrier obtained with the apparatus.

2. Description of the Related Art

An apparatus as defined in the opening paragraph is known from European Patent Application EP-A 693,214, Document D1 in the List of Related Documents. The known apparatus is meant for recording a digital video signal and an associated audio signal in the slant tracks on the record carrier. Further, a subcode signal is recorded in a subcode signal recording portion of the tracks. The subcode signal generally comprises information, such as absolute and relative time information, and a Table of Contents.

The above citations and those in the List of Related Documents are hereby incorporated in whole herein by reference.

SUMMARY OF THE INVENTION

The invention aims at providing a recording apparatus for recording time code signals at specific locations in the subcode signal recording portions in the tracks. To that purpose, the apparatus in accordance with the invention is characterized in that the means for generating is adapted to generate time code signals for accommodating in specific subcode signal blocks in the subcode signal recording portion having a sequence number that satisfies the following formula:

$$N(i)=\{N(i-1)+1+2\cdot p\}\bmod 2^m,$$

where p is an integer positive constant for which holds $0 \leq p \leq 2^{(m-1)}-1$ and N(i) is the sequence number of the subcode sync block in a track numbered i in which a time code signal can be recorded, and that N(i) is an integer that can have a value from 0 to $2^m-1$.

The invention is based on the recognition to shuffle the position of the time code signals over the subcode signal recording portions in such a way that, when taking the track shift of the tracks relative to each other into account, a distribution of the time code signals over the subcode signal recording portions is realized that is as random as possible, so that the negative influence of scratches on the record carrier and drop outs on the detection of the time code signals during reproduction, is decreased. The greatest common denominator of the values (1+2.p) and $2^m$ in the above formula equals 1. By definition, the period of the time code signals is always maximum ($2^m$), so that the best detection of the time code signals upon reproduction can be realized.

In a first embodiment, the apparatus is further characterized in that the means for generating further comprises determining means for determining sequence numbers of subcode signal blocks in the subcode signal recording portion in accordance with said formula, and that the means for generating are further adapted to generate a time code signal for accommodating the time code signal in a specific subcode signal block having a sequence number obtained in accordance with the above formula.

This enables the recording of time code signals in specific subcode sync blocks, where it is still free to choose the exact location within the subcode sync block to accommodate the time code signal.

In a second embodiment, the apparatus is characterized in that a subcode sync block comprises a number of R packs, the means for generating being adapted to accommodate a time code signal in a specific one pack of a subcode sync block of the sequence of $2^m \cdot R$ packs in a subcode signal recording portion, this pack having a sequence number that satisfies the following formula:

$$n(i)=\{n(i-1)+R+2\cdot p\cdot R\}\bmod(2^m\cdot R)$$

where n(i) is the sequence number of the pack in a track numbered i in which the time code signal can be recorded. In this embodiment, the exact location of a time code signal in a pack is established.

BRIEF DESCRIPTION OF THE DRAWINGS

These and other objects of the invention will be described in further detail with reference to the accompanying drawings, in which.

DESCRIPTION OF THE PREFERRED EMBODIMENTS

Figure 1:
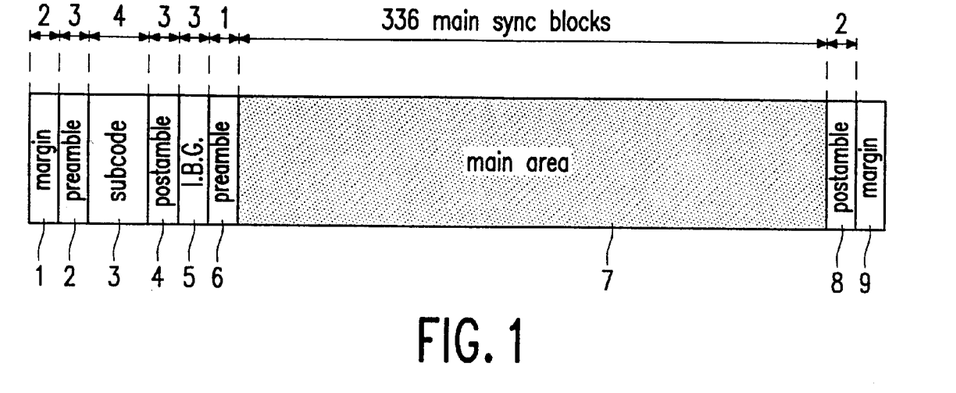
FIG. 1 shows the track format of the tracks recorded on a record carrier.

FIG. 1 shows the track format of the tracks recorded by the recording apparatus in accordance with the invention.

The track is recorded and read in a direction from left to right in the figure. In the present example, the lengths of the various track portions in FIG. 1 are expressed in number of main sync blocks, where a main sync block has a length of 112 bytes of 8 bits each.

First, a clock run-in portion 1, denoted 'margin', is recorded, which in the present example, is 2 main sync blocks long. Next, a preamble portion 2 to have which is 3 main sync blocks long. A subcode signal recording portion 3 follows the preamble portion 2 and is 4 main sync blocks long. The subcode signal recording portion 3 is meant to have a subcode signal recording therein. The subcode signal can comprise, among others, absolute and/or relative time information and a Table of Contents.

Next, a postamble portion 4 follows, which is 3 main sync blocks long, an edit gap 5, denoted 'IBG', which is 3 main sync blocks long and a preamble portion 6, which is, in the present example 1 main sync block long. Next, the information signal recording portion 7 follows and is denoted 'main area', which is 336 main sync blocks long. The information signal recording portion 7 is meant to have the information signal recorded therein. The information signal can be a digital video signal and/or a digital audio signal, which may have been encoded into an MPEG information signal.

The information signal recording portion 7 is followed by a postamble portion 8, which is 2 main sync blocks long and another 'margin' portion 9, the length of which is not relevant, but can be assumed to be 2 main sync blocks long, for the present example. In total, the track thus comprises 356 main sync blocks.

Figure 2:
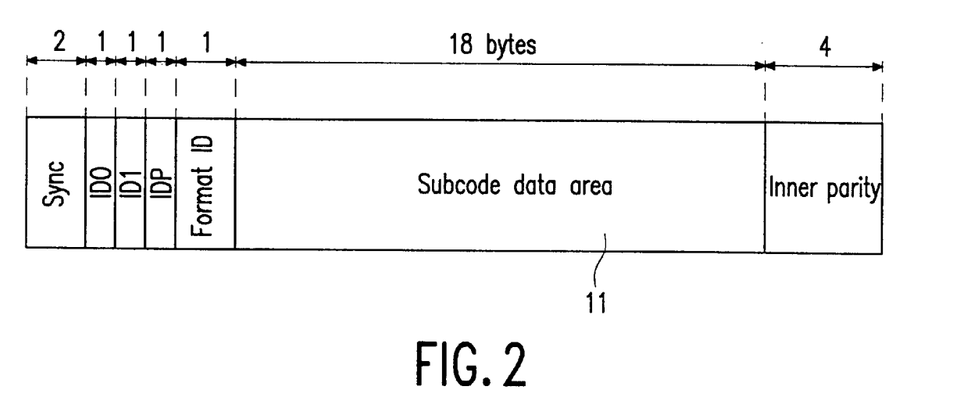
FIG. 2 shows the format of a subcode sync block comprised in the subcode signal recording portion of the track shown in FIG. 1.
Figure 3:
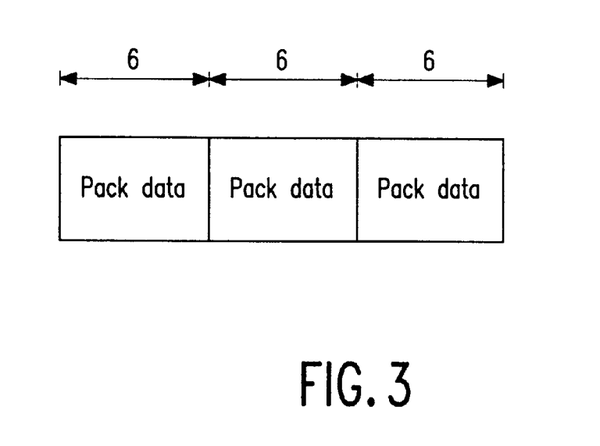
FIG. 3 shows the division of the subcode data area of the subcode sync block into packs of data.

The subcode signal recording portion 3 comprises subcode signal blocks (or subcode sync blocks), the format of which is shown in FIG. 2. A subcode sync block is 28 bytes long and comprises a sync word of 2 bytes long, two identification bytes ID0, ID1 and an ID parity byte IDP, a format ID byte, a subcode data area 11 which is 18 bytes long, and a parity area which is 4 bytes long. As explained with reference to FIG. 1, the subcode signal recording portion 3 has a length of 4 main sync blocks, which equals a length of (4×112=) 448 bytes. As a result, a subcode signal recording portion comprises 16 subcode sync blocks. The subcode data area 11 of FIG. 2 is subdivided into three packs, each pack comprising 6 bytes, as shown in FIG. 3. In total, each subcode signal recording portion thus comprises (16×3=) 48 packs.

Figure 4:
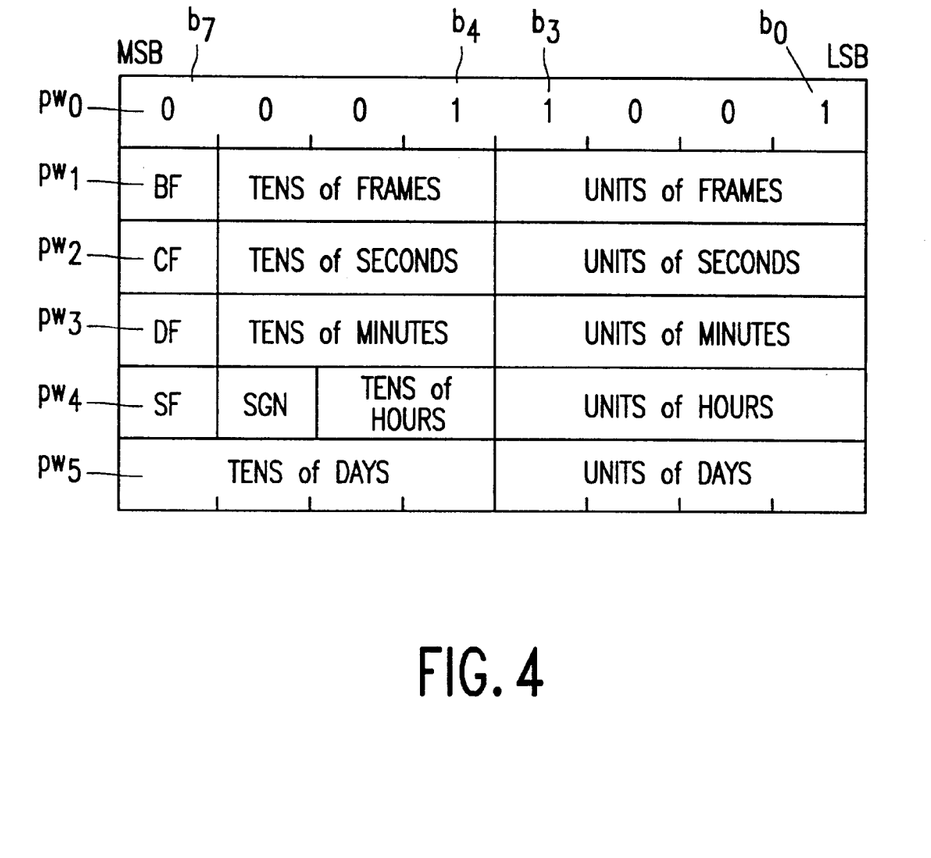
FIG. 4 shows the accommodation of a time code signal in a pack.

A time code signal has to be recorded at least once in the subcode signal recording portions 3 of a group of at least m successive tracks, where m is an integer larger than 1. It is assumed that m equals 2. More specifically, a time code signal is accommodated in one pack. FIG. 4 shows the accommodation of an absolute time code signal in a pack. The pack comprises, as explained above, 6 pack bytes or pack words pw0 to pw5. The first word pw0 identifies the pack to be a pack comprising the absolute time code signal. The second pack word pw1 comprises a frame number, expressed in units of frames, by the four least significant bits $b_0$ to $b_3$ of pw1, and tens of frames, by the three bits $b_4$ to $b_6$. The absolute time code signal is stored in the pack words pw2, pw3 and pw4. More specifically, the 'second' information of the absolute time code signal is stored in pw2, such that the units of seconds are expressed by the four least significant bits $b_0$ to $b_3$ of pack word pw2 and the tens of second are expressed by the bits $b_4$ to $b_6$ of pw2. The 'minute' information is stored in pw3, such that the units of minutes are expressed by the four least significant bits $b_0$ to $b_3$ of pack word pw3 and the tens of minutes are expressed by the bits $b_4$ to $b_6$ of pw3. The 'hour' information is stored in pw4, such that the units of hour are expressed by the four least significant bits $b_0$ to $b_3$ of pack word pw4 and the tens of hours are expressed by the bits $b_4$ and $b_5$ of pw4. Further, time information, expressed in numbers of days, can be accommodated in pack word $pw_5$. The meaning of the bit $b_7$ in the pack words $pw_1$ to $pw_4$ will not be explained, as they are irrelevant for the present invention.

Next a recipe follows for determining in which of the 48 packs in a subcode signal recording portion, an absolute time code signal can be recorded. When the packs in a subcode signal recording portion in a track, numbered i, are numbered n(i), where n(i) runs from 0 to 47, then the following formula give the positions of the packs in subsequent tracks where the absolute time code signal can be stored:

$$n(i)=\{n(i-1)+39\}\bmod 48. \quad\quad (\text{Eq. 1})$$

It should be noted here that upon the start of recording, the first value of n(i) generated can be an arbitrary value between 0 and 47.

Figure 5:
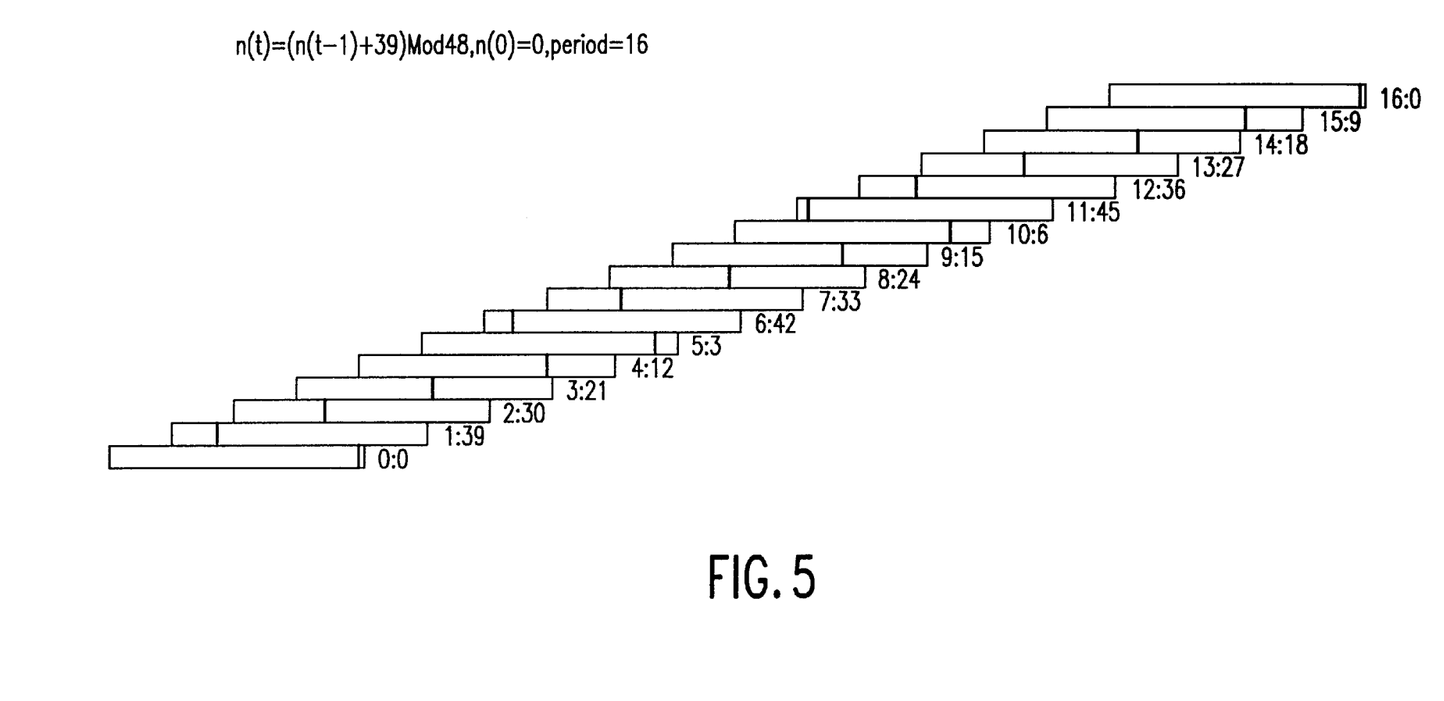
FIG. 5 shows one embodiment of the accommodation of time code signals in the subcode signal recording portions of subsequent tracks.

With the above formula, the exact location, expressed in pack number, for storing the absolute time code signal can be derived. The formula given above realize cycles of 16 different pack numbers. FIG. 5 shows the positions for storing the absolute time code signals in 16 subsequent tracks, assuming n(0)=0, by the bold lines. FIG. 5 only shows the subcode signal recording portions in the 16 subsequent tracks, shifted with respect to each other in accordance with the helical scan recording format. In the first track (i=0), the position for recording an absolute time code signal is pack number 0 (n(0)=0). In the next track (i=1), the position for recording an absolute time code signal is in pack no. 39 (n(1)=39). In the next track (i=2), the position for recording an absolute time code signal is in pack no. 30 (n(2)=30) . . . , and so on.

One can thus store an absolute time code signal in each of the packs, derived in the way given above, using the above formula. It was further explained above, that a requirement may exist that a time code signal has to be recorded at least once in the subcode signal recording portions 3 of a group of at least m successive tracks. In the situation where m is chosen equal to 2, one could thus leave some of the absolute time code out, as long as the above requirement is satisfied.

One could, in an alternative embodiment, replace the above Eq. 1 by the equation given below:

$$N(i)=\{N(i-1)+13\}\bmod 16 \quad\quad (\text{Eq. 2})$$

In this equation, N(i) indicates the subcode sync block number of the subcode sync block in track numbered i in which the absolute time code signal could be stored. Note that N(i) runs from 0 to 15, as there are 16 subcode sync blocks in a subcode signal recording portion. Eq. 2 has been obtained from Eq. 1, by dividing the integer numbers in Eq. 1 by 3, as each subcode sync block comprises 3 packs.

Using the Eq. 2, one has the additional freedom to choose in which of the three packs in a subcode sync block the absolute time code signal should be stored.

A more general equation for Eq. 1, is the equation given below:

$$n(i)=\{n(i-1)+3+p\cdot 6\}\bmod 48 \quad\quad (\text{Eq. 3})$$

where p is an integer value for which holds: $0 \leq p \leq 7$. n(i) is thus expressed as a pack number. This equation can again be converted into a more general equation for Eq. 2, by dividing the integer numbers by 3, so as to obtain $$N(i)=\{N(i-1)+1+p\cdot 2\}\bmod 16 \qquad (\text{Eq. 4})$$

Figure 6:
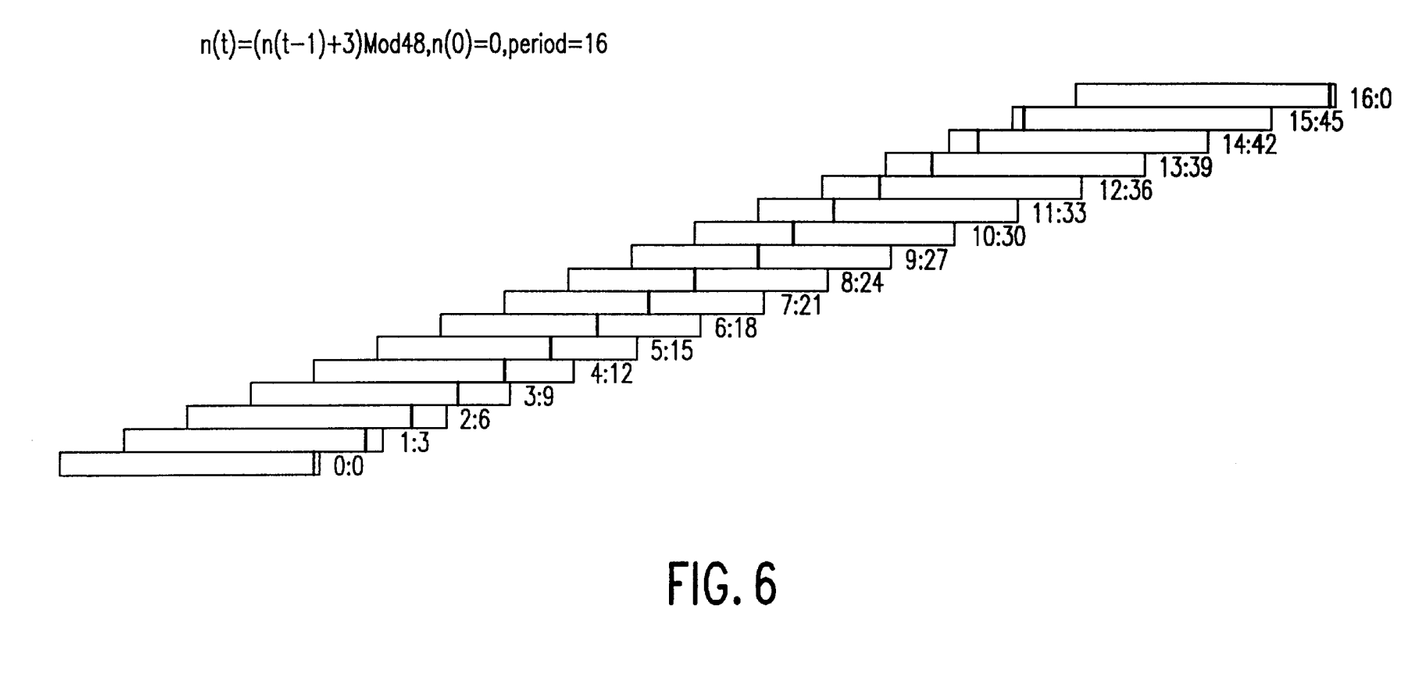
FIG. 6 shows another embodiment of the accommodation of time code signals in the subcode signal recording portions of subsequent tracks.
Figure 7:
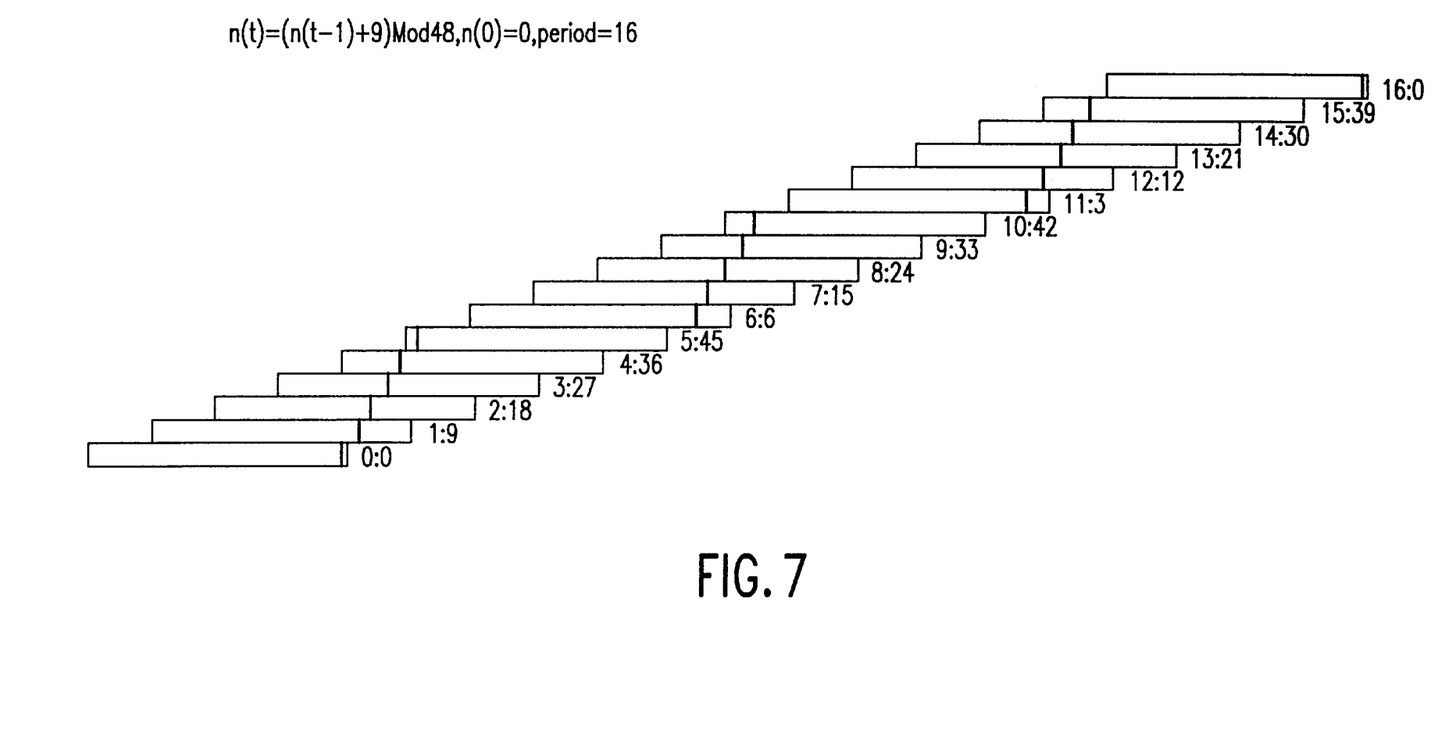
FIG. 7 shows, again, another embodiment of the accommodation of time code signals in the subcode signal recording portions of subsequent tracks.
Figure 8:
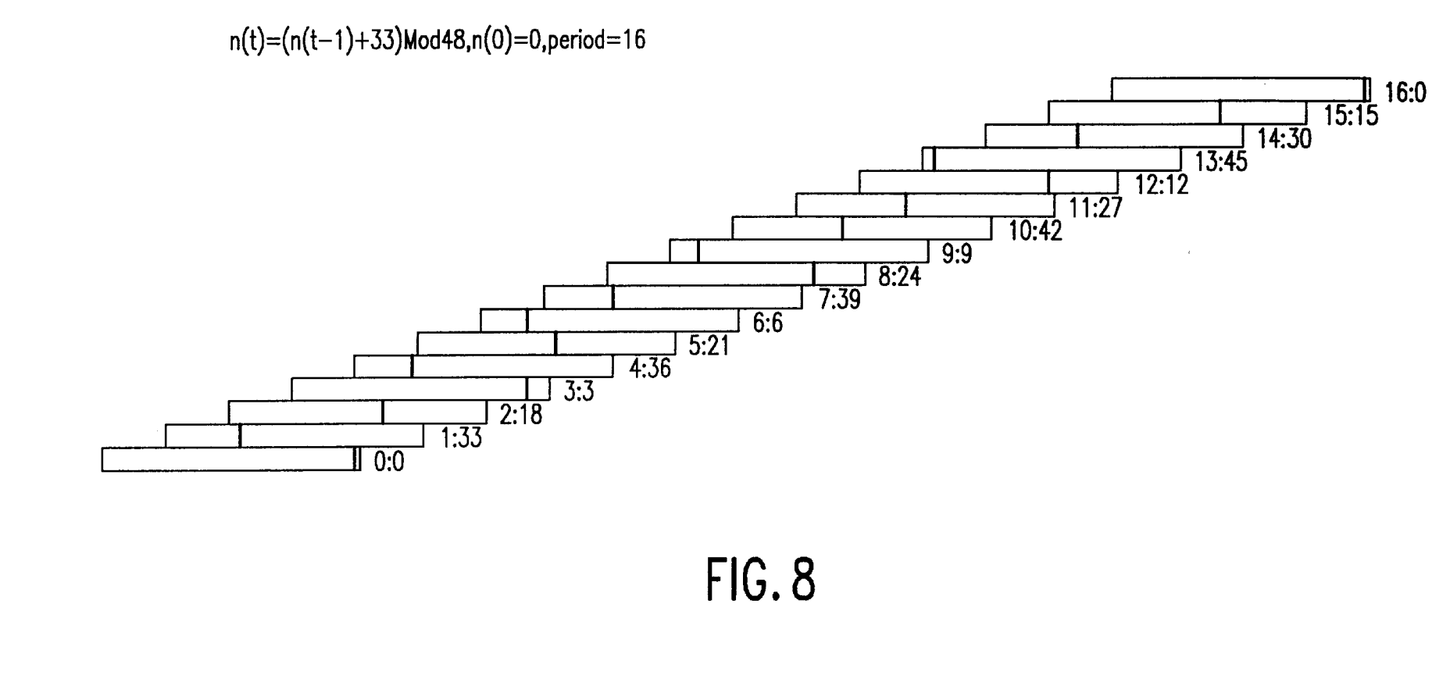
FIG. 8 shows a further embodiment of the accommodation of time code signals in the subcode signal recording portions of subsequent tracks.

FIG. 6, 7 and 8 show examples of the positions of the absolute time code signals for other values of p, using the Eq. 3, the value for p for FIG. 6 being equal to 0, p being equal to 1 for FIG. 7, and p being equal to 5 for FIG. 8.

It is an object of the invention to position the time code signals in such a way in the subcode signal recording portions that the geometric shift of the tracks on tape relative to each other has been taken into account. This leads to a robust system for recording the time code signals, such that the negative effects of scratches on tape and drop outs are minimizeol. Preferably, the values 5 or 6 are chosen for p, in that with these values, the absolute time code signals can be recorded in more randomly distributed positions in the subcode signal recording portions of subsequent tracks.

An even more general formula for the sequence numbers is given below:

$$N(i)=\{N(i-1)+1+2p\cdot\}\bmod 2^m \qquad (\text{Eq. 5})$$

or the sync block sequence numbers N(i) and $$n(i)=\{n(i-1)+R+2\cdot p\cdot R\}\bmod(2^m\cdot R) \qquad (\text{Eq. 6})$$

for the pack numbers n(i).

Figure 9:
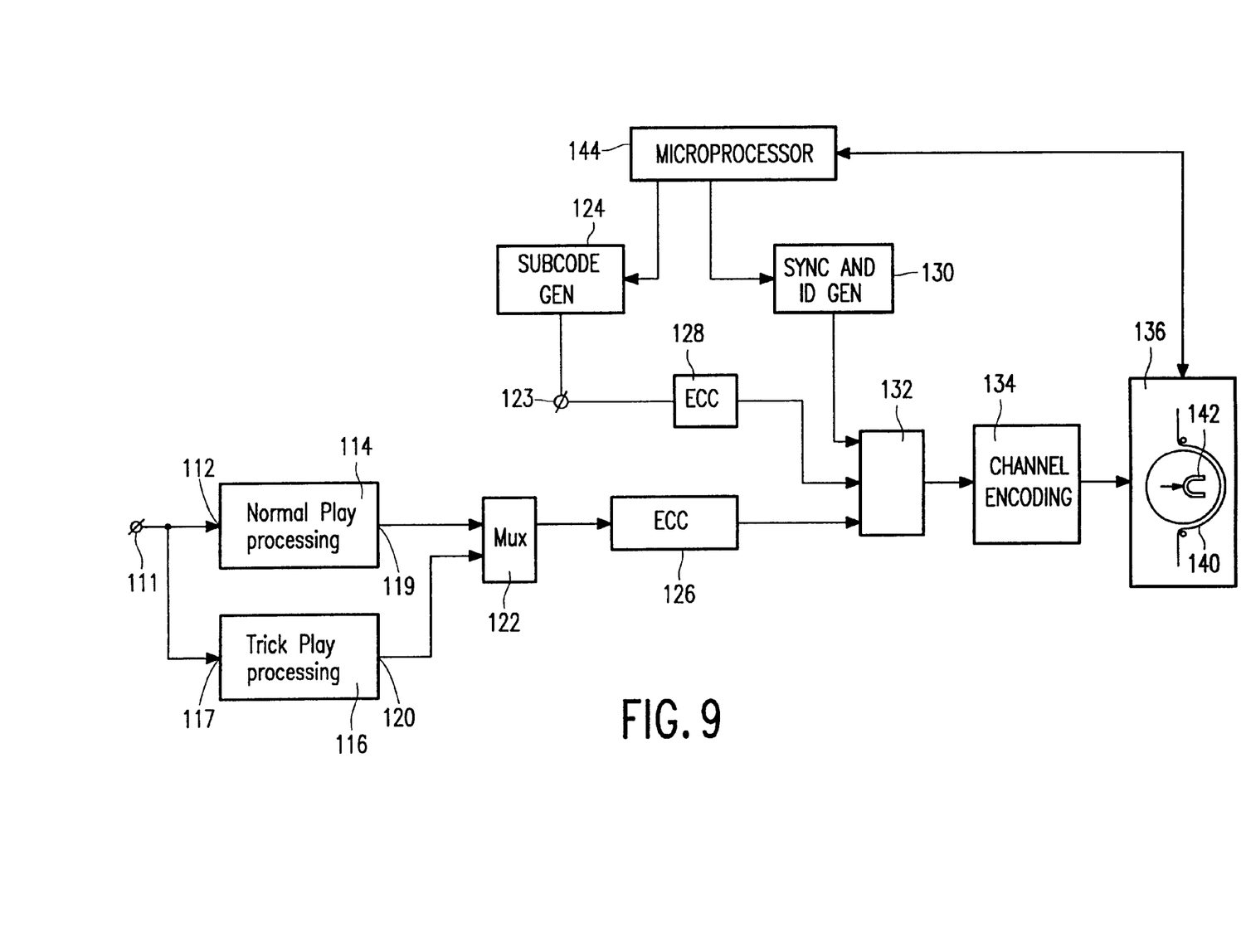
FIG. 9 shows an embodiment of a recording apparatus in accordance with the invention.

FIG. 9 shows an embodiment of the recording apparatus for recording the subcode signal and the information signal. The recording arrangement comprises an input terminal 111 for receiving a video signal and a corresponding audio signal. The video signal and the corresponding audio signal may have been encoded into transport packets included in an MPEG serial datastream, well known in the art. The input terminal 111 is coupled to an input 112 of a 'normal play' processing unit 114. Optionally, a 'trick play' processing unit 116 is provided having an input 117 also coupled to the input terminal 111. Outputs 119 and 120 of the 'normal play' processing unit 114 and the 'trick play' processing unit 116 (if present) are coupled to corresponding inputs of a multiplexer 122. It will be clear that in the absence of the 'trick play' processing unit 116, also the multiplexer 122 will be absent. The 'normal play' information as well as the 'trick play' information will be recorded in the main area recording portion 7 of the track shown in FIG. 1.

For a further description of the 'normal play' processing unit 114 and the 'trick play' processing unit 116, reference is made to European Patent Application EP-A 702,877, Document D2 in the List of Related Documents, and International Patent Application WO 95/28,061, Document D3 in the List of Related Documents.

A subcode signal generator 124 is present for supplying the subcode signal information for storage in the subcode signal blocks in the subcode signal recording portion, see FIGS. 1 to 4. Outputs of the multiplexer 122 and the generator 124 are coupled to corresponding inputs of error correction encoder units 126 and 128, respectively. The error correction encoder unit 126 is capable of carrying out an error correction encoding step on the video and audio information so as to obtain parity information for storage in the main sync blocks. The error correction encoder 128 is capable of carrying out an error correction encoding step on the subcode information so as to obtain the parity information shown in the last four bytes of the subcode sync block in FIG. 2.

The recording apparatus further comprises a generator 130 for adding the ID information, such as shown in FIG. 2, and sync words. After combination of the signals in the combining unit 132, the combined signal is applied to a unit 134, in which a channel encoding is carried out on the composite signal. The channel encoding carried out in the encoding unit 134 is well known in the art. For an example of such channel coding, reference is made in this respect to U.S. Pat. No. 5,142,421, Document D4 in the List of Related Documents.

An output of the channel encoding unit 134 is coupled to an input of a writing unit 136, in which the datastream obtained with the encoding unit 134 is recorded in the slant tracks on a record carrier 140, by means of at least one write head 142.

A microprocessor unit 144 is present for controlling the functioning of the various blocks, such as the control of the transport velocity of the record carrier 140, the rotation of the head drum, the generation of the subcode information and the supply of the sync words and the ID information.

While the invention has been described with reference to preferred embodiments thereof, it is to be understood that these are not limitative examples. Thus, various modifications may become apparent to those skilled in the art, without departing from the scope of the invention, as defined by the claims. The information signal thus may be another type of signal than a digital video signal and/or an audio signal, such as a data signal.

Further, the invention lies in each and every novel feature or combination of features. LIST OF RELATED DOCUMENTS (D1) European Patent Application EP-A 693,214, corresponding to U.S. patent application Ser. No. 08/385,511, filed Feb. 8, 1995 (PHN 14,734)

(D2) European Patent Application EP-A 702,877, corresponding to U.S. Pat. No. 5,579,183 (PHN 14,818)

(D3) International Patent Application WO 95/28,061, corresponding to U.S. Pat. No. 5,751,889 (PHN 14,832;

(D4) U.S. Pat. No. 5,142,421 (PHN 13,537)

What is claimed is:

1. An apparatus for recording a digital information signal and a subcode signal in slant tracks on a record carrier, the apparatus comprising:

input means for receiving the digital information signal and the subcode signal;

formatting means for accommodating portions of information of the subcode signal into subcode signal blocks, for accommodating portions of information of the information signal into information signal blocks, and for combining the subcode signal blocks and the information signal blocks into a composite signal for recording in the slant tracks on the record carrier;

means for generating a time code signal and for accommodating time code signals in specific subcode signal blocks; and writing means for writing the composite signal in said slant tracks on the record carrier, such that a number $2^m$ of subcode signal blocks are recorded in a subcode signal recording portion of a track, and a plurality of information signal blocks are recorded in an information signal recording portion of a track, where m is an integer larger than 2, wherein the means for generating generates time code signals for accommodating in specific subcode signal blocks in the subcode signal recording portion, each of said specific subcode signal blocks having a sequence number that satisfies the following first formula:

$$N(i)=\{N(i-1)+1+2 \cdot p\} \bmod 2^m,$$

where p is a positive integer constant for which $0 \leq p \leq 2^{(m-1)}-1$, i is a track number, and N(i) is the sequence number of the subcode signal block in a track numbered i in which a time code signal can be recorded, and that N(i) is an integer having a value from 0 to $2^m-1$.

2. The apparatus as claimed in claim 1, characterized in that the means for generating generates a first sequence number having an arbitrary value in the range from 0 to $2^m-1$, upon the start of the recording of the digital information signal.

3. The apparatus as claimed in claim 1, characterized in that the means for generating further comprises determining means for determining sequence numbers of subcode signal blocks in the subcode signal recording portion in accordance with said first formula, and that the means for generating further generates a time code signal for accommodating the time code signal in a specific subcode signal block having a sequence number obtained in accordance with said first formula.

4. The apparatus as claimed in claim 1, characterized in that a subcode sync block comprises a number R of packs, where R is a positive integer, and the means for generating accommodates a time code signal in a specific pack of a subcode sync block of the sequence of $2^m \cdot R$ packs in a subcode signal recording portion, said specific pack having a sequence number that satisfies the following second formula:

$$n(i)=\{n(i-1)+R+2 \cdot p \cdot R\} \bmod (2^m \cdot R)$$

where n(i) is the sequence number of the specific pack in a track numbered i in which the time code signal can be recorded.

5. The apparatus as claimed in claim 4, characterized in that the means for generating further comprises determining means for determining sequence numbers of packs in the subcode signal recording portion in accordance with said second formula, and that the means for generating further generates a time code signal for accommodating the time code signal in a specific pack having a sequence number obtained in accordance with said second formula.

6. The apparatus as claimed in claim 1, characterized in that m=4.

7. The apparatus as claimed in claim 4, characterized in that R=3.

8. The apparatus as claimed in claim 1, characterized in that $1 \leq p \leq 2^{(m-1)}-2$.

9. The apparatus as claimed in claim 1, characterized in that p equals 5 or 6.

10. A record carrier having a digital information signal and a subcode signal recorded in slant tracks on a record carrier, obtained with the apparatus as claimed in claim 1.

11. A method of recording a digital information signal and a subcode signal in slant tracks on a record carrier, the method comprising the steps:

receiving the digital information signal and the subcode signal;

accommodating portions of information of the subcode signal into subcode signal blocks, accommodating portions of information of the information signal into information signal blocks, and combining the subcode signal blocks and the information signal blocks into a composite signal for recording in the slant tracks on the record carrier;

generating a time code signal and accommodating time code signals in specific subcode signal blocks; and writing the composite signal in said slant tracks on the record carrier, such that a number $2^m$ of subcode signal blocks are recorded in a subcode signal recording portion of a track, where m is an integer larger than 2, and a plurality of information signal blocks are recorded in an information signal recording portion of a track, wherein the generating step comprises the substep:

generating time code signals for accommodating in specific subcode signal blocks in the subcode signal recording portion, each of said specific subcode signal blocks having a sequence number that satisfies the following formula:

$$N(i)=\{N(i-1)+1+2 \cdot p\} \bmod 2^m,$$

where p is a positive integer constant for which holds $0 \leq p \leq 2^{(m-1)}-1$, i is a track number, and N(i) is the sequence number of the subcode signal block in a track numbered i in which a time code signal can be recorded, and that N(i) is an integer having a value from 0 to $2^m-1$.

* * * * *